US012772030B2

(12) United States Patent
Chu

(10) Patent No.: US 12,772,030 B2
(45) Date of Patent: Oct. 20, 2026

(54) GATT SERVICE DISCOVERY PROCEDURE FOR TWO OR MORE DEVICES

(71) Applicant: MEDIATEK INC., Hsin-Chu (TW)

(72) Inventor: Chao-Tsung Chu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 792 days.

(21) Appl. No.: 18/086,661

(22) Filed: Dec. 22, 2022

(65) Prior Publication Data

US 2023/0239672 A1 Jul. 27, 2023

Related U.S. Application Data

(60) Provisional application No. 63/297,248, filed on Jan. 7, 2022.

(51) Int. Cl.

| | |
|---|---|
| ***H04W 8/00*** | (2009.01) |
| ***H04R 1/10*** | (2026.01) |
| ***H04W 4/80*** | (2018.01) |

(52) U.S. Cl.

CPC .......... *H04W 8/005* (2013.01); *H04R 1/1016* (2013.01); *H04W 4/80* (2018.02); *H04R 2420/07* (2013.01)

(58) Field of Classification Search

CPC ....... H04W 8/005; H04W 4/80; H04R 1/1016

See application file for complete search history.

(56) References Cited

U.S. PATENT DOCUMENTS

2015/0319674 A1 11/2015 Hughes
2015/0351145 A1* 12/2015 Burks .................. H04L 63/102 455/41.3
2017/0295539 A1* 10/2017 Gu .......................... H04W 8/24
2019/0373653 A1 12/2019 Kwon
2021/0409856 A1 12/2021 Zhu
2024/0031456 A1* 1/2024 Wang ...................... H04L 69/08

FOREIGN PATENT DOCUMENTS

| | | | |
|---|---|---|---|
| CN | 105974803 | A | 9/2016 |
| CN | 110784859 | A | 2/2020 |
| CN | 112787685 | A | 5/2021 |
| EP | 3 893 109 | A1 | 10/2021 |
| KR | 10-2021-0000228 | | 1/2021 |
| WO | 2020/107485 | A1 | 6/2020 |
| WO | 2020/246768 | | 12/2020 |

OTHER PUBLICATIONS

Hansen Mi, “Understanding the BLE 5 Protocol Stack—Generic Attribute Profile Layer”, Chinese Software Developer Network, Sep. 29, 2018. https://blog.csdn.net/weixin_42396877/article/details/82899696?ops_request_, Sep. 29, 2018.

* cited by examiner

*Primary Examiner* — David Bilodeau

(74) *Attorney, Agent, or Firm* — Winston Hsu

(57) ABSTRACT

The present invention provides a control method of an electronic device, wherein the control method includes the steps of: wirelessly connecting to a first device; performing a service discovery to the first device to retrieve a plurality of attribute handles from the first device; storing the plurality of attribute handles of the first device into a database cache; wirelessly connecting to a second device; determining whether the second device and the first device have the same attribute handles; and in response to the second device having the same attribute handles as the first device, directly using the plurality of attribute handles of the first device stored in the database cache, for using services of the second device.

14 Claims, 4 Drawing Sheets

GATT SERVICE DISCOVERY PROCEDURE FOR TWO OR MORE DEVICES

CROSS REFERENCE TO RELATED APPLICATIONS

This application claims the benefit of U.S. Provisional Application No. 63/297,248, filed on Jan. 7, 2022. The content of the application is incorporated herein by reference.

BACKGROUND

A Generic Attribute (GATT) profile establishes in detail how to exchange all profile and user data over a Bluetooth low energy (BLE) connection. GATT profile defines two roles named as a server and a client, wherein the server is a device which stores attribute data locally, and the client is a device which accesses data on the server. In the communication between the server and the client, because the client does not know anything in advance about the server's attributes, the client must inquire about the presence and nature of those attributes by performing a service discovery. After completing the service discovery, the client can start accessing the server.

Nowadays, many multipoint Bluetooth devices such as a pair of earphones or a group of speakers are released. If the client needs to use the services of these multipoint Bluetooth devices, the client needs to perform the service discovery to each of the devices. Therefore, since the client needs to perform two or more service discovery steps before using the service, it will lead to a long waiting time and also increase the power consumption of the client.

SUMMARY

It is therefore an objective of the present invention to provide a GATT service discovery method, which can perform the service discovery to only one server before using the service of at least two serves, to solve the above-mentioned problems.

According to one embodiment of the present invention, a control method of an electronic device comprises the steps of: wirelessly connecting to a first device; performing a service discovery to the first device to retrieve a plurality of attribute handles from the first device; storing the plurality of attribute handles of the first device into a database cache; wirelessly connecting to a second device; determining whether the second device and the first device have the same attribute handles; and in response to the second device having the same attribute handles as the first device, directly using the plurality of attribute handles of the first device stored in the database cache, for using services of the second device.

According to one embodiment of the present invention, a circuitry of an electronic device is configured to perform the steps of: wirelessly connecting to a first device; performing a service discovery to the first device to retrieve a plurality of attribute handles from the first device; storing the plurality of attribute handles of the first device into a database cache; wirelessly connecting to a second device; determining whether the second device and the first device have the same attribute handles; and in response to the second device having the same attribute handles as the first device, directly using the plurality of attribute handles of the first device stored in the database cache, for using services of the second device.

According to one embodiment of the present invention, an electronic device comprising a wireless network module and a storage device is disclosed. The wireless network module wirelessly connects to a first device, performs a service discovery to the first device to retrieve a plurality of attribute handles from the first device, and stores the plurality of attribute handles of the first device into the storage device; and the wireless network module wirelessly connects to a second device, and determines whether the second device and the first device have the same attribute handles; and in response to the second device having the same attribute handles as the first device, the wireless network module directly uses the plurality of attribute handles of the first device stored in the storage device, for using services of the second device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
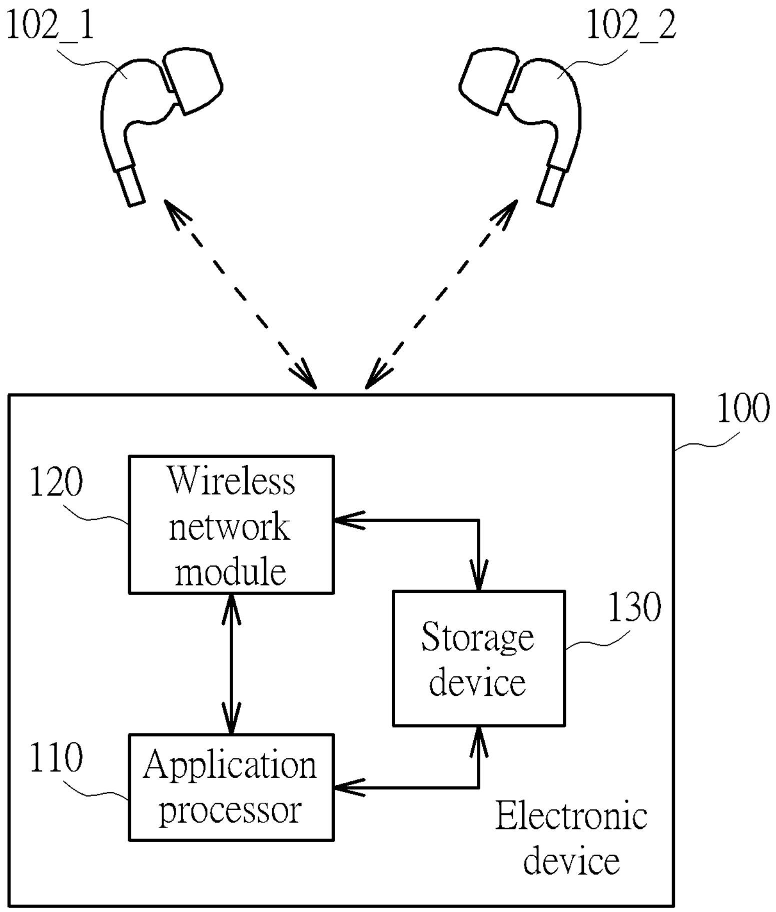
FIG. 1 is a diagram illustrating an electronic device according to one embodiment of the present invention.

FIG. 1 is a diagram illustrating an electronic device 100 according to one embodiment of the present invention. In this embodiment, the electronic device 100 may be a smartphone, a tablet, a notebook or any other electronic device that has a wireless communication function, and the electronic device 100 comprises an application processor 110, a wireless network module 120 and a storage device 130. The application processor 110 is arranged to execute applications running on a system of the electronic device 100. The wireless network module 120 is configured to wirelessly connect to other electronic devices. The storage device 130 may comprise a plurality of different storage elements, and stores data related to the application processor 110 and the wireless network module 120. In addition, part of the storage device 130 may be integrated into the wireless network module 120 or the application processor 110.

Figure 2:
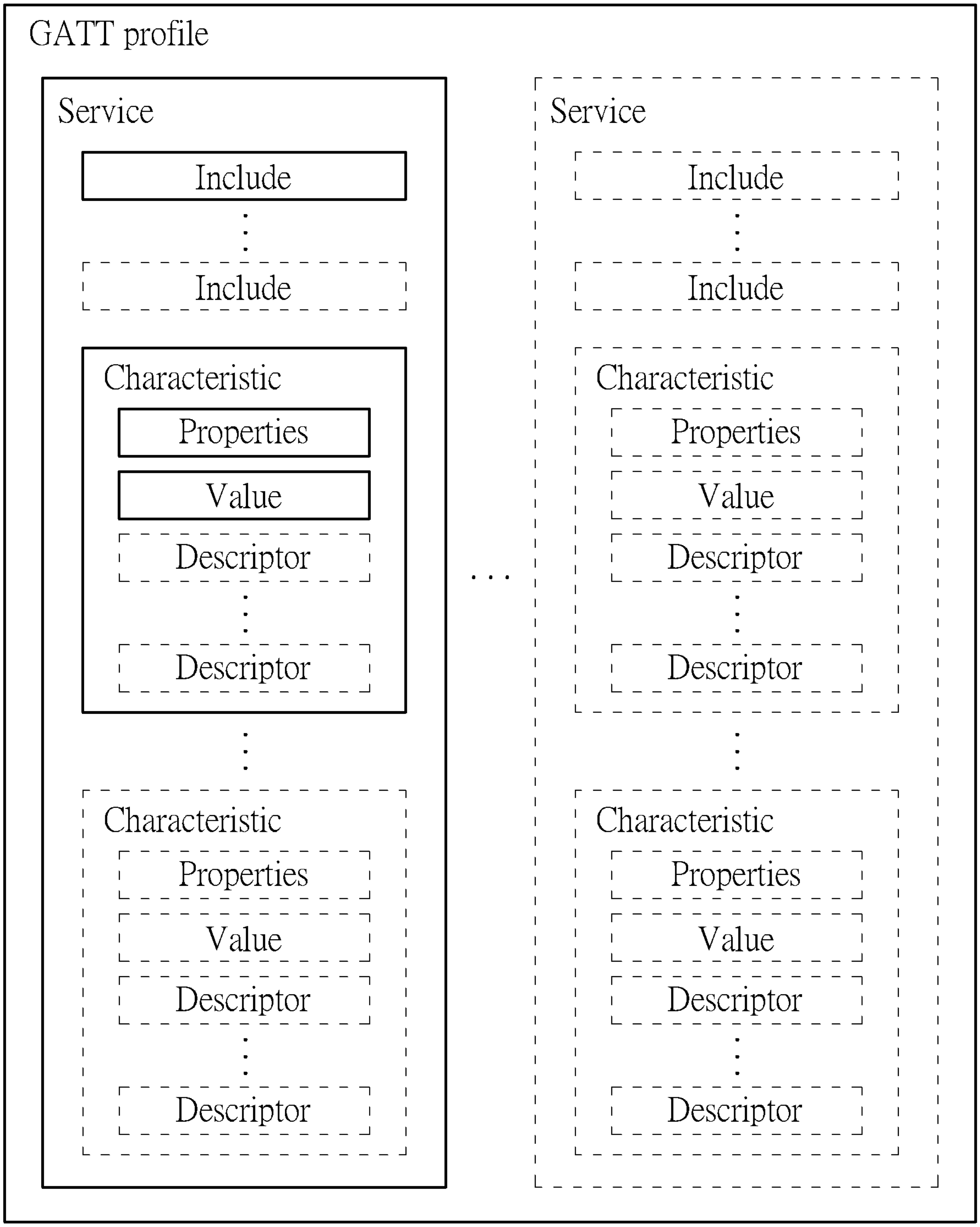
FIG. 2 shows a GATT profile.
Figure 3:
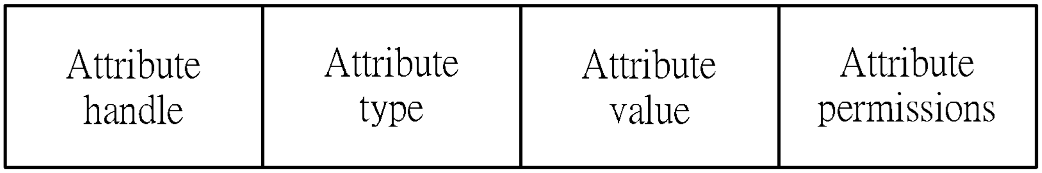
FIG. 3 shows a structure of an attribute of the GATT profile.

In this embodiment, the wireless network module 120 is a Bluetooth module that complies with BLE specification, and the electronic device 100 is able to use the wireless network module 120 to communicate to a first device 102_1 and a second device 102_2 shown in FIG. 1, wherein the first device 102_1 and the second device 102_2 may be a pair of earphones. In this embodiment, the electronic device 100 serves as a GATT client, and the first device 102_1 and the second device 102_2 serve as GATT servers. In a GATT profile shown in FIG. 2, the GATT profile comprises at least one service, each service comprises at least one characteristic, and each characteristic comprises attributes such as declaration, properties, value and descriptor. In addition, attributes are the smallest data entity defined by GATT, and each attribute comprises an attribute handle, an attribute type, an attribute value and attribute permissions as shown in FIG. 3. The attribute handle is a unique 16-bit identifier for each attribute on a particular GATT server, and it is the part of each attribute that makes it addressable, and it is guaranteed not to change between transactions or connections. The attribute type is a universally unique identifier (UUID) which can be 2 or 16 bytes, wherein the attribute type determines the kind of data present in the value of the attribute. The attribute value holds the actual data content of the attribute. The attribute permissions are metadata that specify which operations can be executed on each particular attribute and with which specific security requirements, for example, read only, no authentication, no authorization etc. It is noted that the GATT profile and the structure of the attribute are known by a person skilled in the art, the detailed descriptions about GATT profile and attribute are omitted here.

The attributes are only in the GATT server, and the GATT client needs the attributes of the GATT server to have the service, so the GATT client needs to perform the service discovery to obtain all the attribute handles of the GATT server and stores the attribute handles into a database cache of the storage device 130. Then, after the service discovery is completed, the GATT client can start using the service of the GATT server, for example, sending an audio signal to the GATT server for playback, or sending a control signal to the GATT server to control its volume. In this embodiment, because the electronic device 100 needs services of the pair of earphones (i.e. the first device 102_1 and the second device 102_2), if it is determined that the first device 102_1 and the second device 102_2 have the same GATT services (i.e. all the attribute handles are the same in device 102_1 and device 102_2), the electronic device 100 can perform the service discovery to the first device 102_1 only to retrieve the attribute handles and stores the retrieved attribute handles into the database cache, then the electronic device 100 directly uses the attribute handles stored in the database cache, without performing the service discovery to the second device 102_2, for using the services of both the first device 102_1 and the second device 102_2. By using the above mechanism, latency of the electronic device 100 can be improved.

Figure 4:
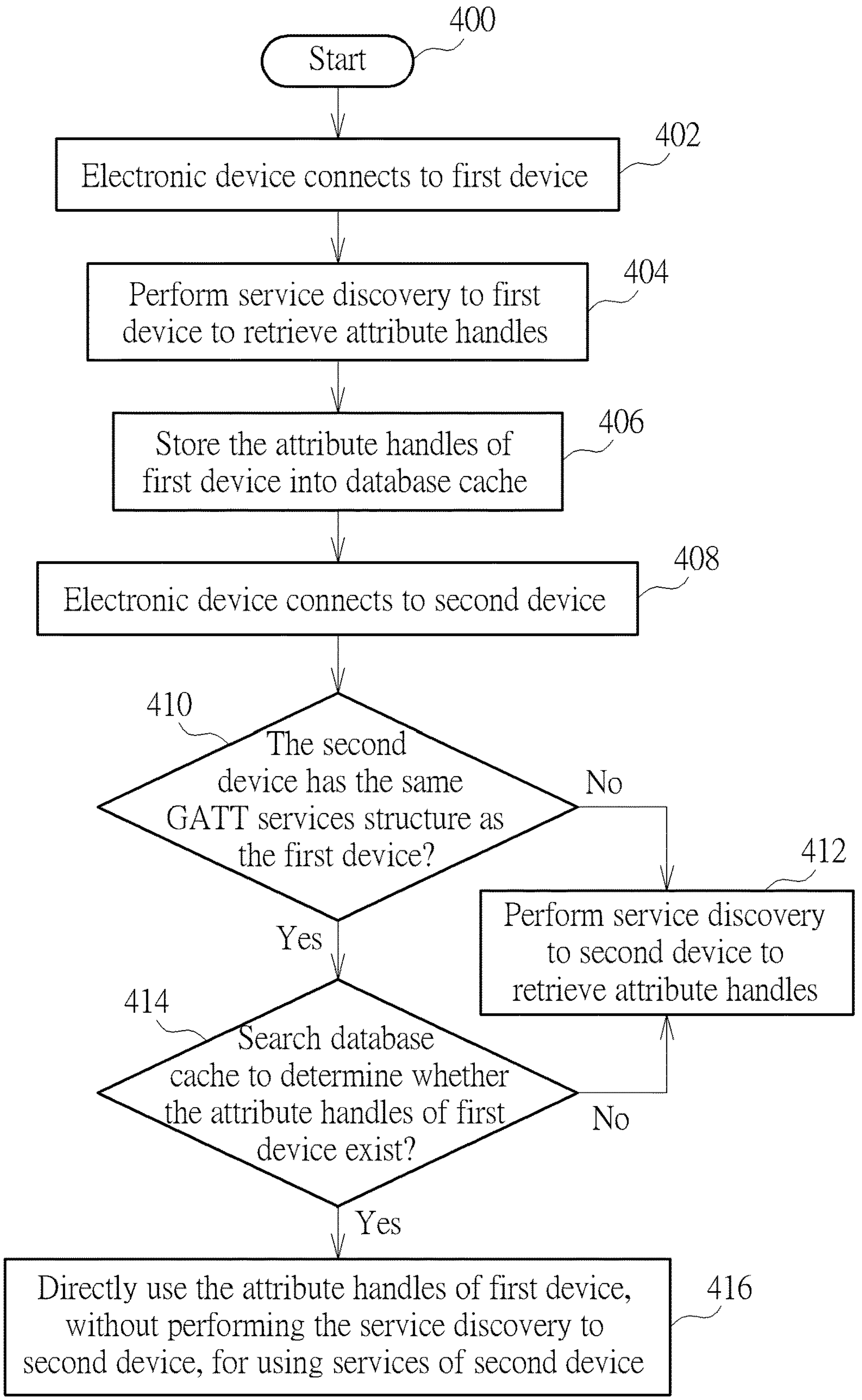
FIG. 4 is a flowchart of a control method between the electronic device, the first device and the second device according to one embodiment of the present invention.

FIG. 4 is a flowchart of a control method between the electronic device 100, the first device 102_1 and the second device 102_2 according to one embodiment of the present invention. In Step 400, the flow starts, and the first device 102_1 and the second device 102_2 are powered on. In Step 402, the electronic device 100 uses the wireless network module 120 to scan surrounding Bluetooth devices, and the first device 102_1 is connected to the electronic device 100. In Step 404, the electronic device 100 performs the service discovery to the first device 102_1 to retrieve all the attribute handles of the first device 102_1. For example, the wireless network module 120 may send a request to the first device 102_1 to obtain a portion of the attribute handles, then send another request to the first device 102_1 to obtain another portion of the attribute handles, . . . until the wireless network module 120 obtains all the attribute handles of the first device 102_1. In Step 406, the wireless network module 120 stores the attribute handles of the first device 102_1 into the database cache. In Step 408, the second device 102_2 starts to connect to the electronic device 100, and at this time, the second device 102_2 does not send any attribute of the GATT profile to the electronic device 100. In Step 410, the wireless network module 120 determines if the second device 102_2 and the first device 102_1 have the same GATT services structure, if yes, the flow enters Step 414; and if not, the flow enters Step 412. Specifically, the wireless network module 120 may read internal sniffer logs to determine if the second device 102_2 and the first device 102_1 have the same GATT services structure; or the first device 102_1 and the second device 102_2 may send a specific signal or specific identity to the wireless network module 120, for the wireless network module 120 knowing that the second device 102_2 and the first device 102_1 have the same GATT services structure; or the wireless network module 120 may ask the first device 102_1 and the second device 102_2 whether they have the same GATT services structure. In Step 412, if it is determined that the second device 102_2 and the first device 102_1 does not have the same GATT services structure, the wireless network module 120 performs the service discovery to the second device 102_2 to obtain all the attribute handles, and stores all the attribute handles of the second device 102_2 into the database cache. In Step 414, the wireless network module 120 searches the database cache to determine if the attribute handles of the first device 102_1 exist, if yes, the flow enters Step 416; and if not, the flow enters Step 412. In Step 416, the wireless network module 120 directly uses the attribute handles of the first device 102_1 stored in the database cache, without performing the service discovery to the second device 102_2, for using the services of both the first device 102_1 and the second device 102_2.

It is noted that a number of GATT servers in the present invention is not limited to two. In other embodiments, the electronic device 100 may connect to three or more GATT servers such as many speakers or several pairs of earphones. In one embodiment, after the Step 412 or the Step 416 is completely executed, if a third device is connected to the electronic device 100, the wireless network module 120 can determine whether the third device has the same GATT services structure as the first device 102_1 and/or the second device 102_2; and if the third device has the same GATT services structure as the first device 102_1 and/or the second device 102_2, the wireless network module 120 can directly use the attribute handles of the first device 102_1 or the attribute handles of the second device 102_2 stored in the database cache, without performing the service discovery to the third device, for using the service of the third device.

Briefly summarized, in the present invention, when the GATT client needs to use the service of two or more GATT servers having the same GATT services structure, the GATT client may perform the service discovery to only one GATT server to obtain attribute handles, and directly use the attribute handles to use services of two or more GATT servers. By using the control method of the present invention, the GATT client can preserve time and power for not doing other service discovery procedures.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A control method of an electronic device, comprising:
wirelessly connecting to a first device;
performing a service discovery to the first device to retrieve a plurality of attribute handles from the first device;
storing the plurality of attribute handles of the first device into a database cache;
wirelessly connecting to a second device;
determining whether the second device and the first device have the same attribute handles; and
in response to the second device having the same attribute handles as the first device, directly using the plurality of attribute handles of the first device stored in the database cache, without performing the service discovery to the second device, for using services of the second device;
wherein the electronic device is a Bluetooth client, and both the first device and the second device are Bluetooth servers.

2. The control method of claim 1, wherein the step of performing the service discovery to the first device to retrieve the plurality of attribute handles from the first device comprises:
performing the service discovery to the first device to retrieve all the attribute handles of the first device.

3. The control method of claim 1, further comprising:
in response to the second device not having the same attribute handles as the first device, performing the service discovery to the second device to retrieve a plurality of attribute handles of the second device; and
storing the plurality of attribute handles of the second device into the database cache.

4. The control method of claim 1, wherein the first device and the second device are a pair of earphones.

5. The control method of claim 1, wherein the plurality of attribute handles comprise services, characteristics and descriptors of a Generic Attribute (GATT) profile.

6. A circuitry of an electronic device, configured to perform the steps of:
wirelessly connecting to a first device;
performing a service discovery to the first device to retrieve a plurality of attribute handles from the first device;
storing the plurality of attribute handles of the first device into a database cache;
wirelessly connecting to a second device;
determining whether the second device and the first device have the same attribute handles; and
in response to the second device having the same attribute handles as the first device, directly using the plurality of attribute handles of the first device stored in the database cache, without performing the service discovery to the second device, for using services of the second device;
wherein the electronic device is a Bluetooth client, and both the first device and the second device are Bluetooth servers.

7. The circuitry of claim 6, wherein the step of performing the service discovery to the first device to retrieve the plurality of attribute handles from the first device comprises:
performing the service discovery to the first device to retrieve all the attribute handles of the first device.

8. The circuitry of claim 6, further comprising:
in response to the second device not having the same attribute handles as the first device, performing the service discovery to the second device to retrieve a plurality of attribute handles of the second device; and
storing the plurality of attribute handles of the second device into the database cache.

9. The circuitry of claim 6, wherein the first device and the second device are a pair of earphones.

10. The circuitry of claim 6, wherein the plurality of attribute handles comprise services, characteristics and descriptors of a Generic Attribute (GATT) profile.

11. An electronic device, comprising:
a wireless network module; and
a storage device;
wherein the wireless network module wirelessly connects to a first device, performs a service discovery to the first device to retrieve a plurality of attribute handles from the first device, and stores the plurality of attribute handles of the first device into the storage device; and the wireless network module wirelessly connects to a second device, and determines whether the second device and the first device have the same attribute handles; and in response to the second device having the same attribute handles as the first device, the wireless network module directly uses the plurality of attribute handles of the first device stored in the storage device, without performing the service discovery to the second device, for using services of the second device;
wherein the electronic device is a Bluetooth client, and both the first device and the second device are Bluetooth servers.

12. The electronic device of claim 11, wherein the wireless network module performs the service discovery to the first device to retrieve all the attribute handles of the first device.

13. The electronic device of claim 11, wherein in response to the second device not having the same attribute handles as the first device, the wireless network module performs the service discovery to the second device to retrieve a plurality of attribute handles of the second device, and stores the plurality of attribute handles of the second device into the storage device.

14. The electronic device of claim 11, wherein the first device and the second device are a pair of earphones.

* * * * *